United States Patent
Schultz et al.

(10) Patent No.: US 7,696,297 B2
(45) Date of Patent: Apr. 13, 2010

(54) BRANCHED POLYCARBONATES AND PROCESSES FOR PRODUCING THE SAME

(75) Inventors: Laura G. Schultz, Evansville, IN (US); James A. Mahood, Evansville, IN (US); Brian D. Mullen, Plymouth, MN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 109 days.

(21) Appl. No.: 12/164,922

(22) Filed: Jun. 30, 2008

(65) Prior Publication Data

US 2009/0326149 A1 Dec. 31, 2009

(51) Int. Cl.
*C08G 64/00* (2006.01)
(52) U.S. Cl. .................. 528/196; 528/198; 528/203; 528/371
(58) Field of Classification Search .............. 528/196, 528/198, 203, 371
See application file for complete search history.

(56) References Cited

U.S. PATENT DOCUMENTS

| RE27,682 | E | 6/1973 | Schnell et al. | |
| 5,426,170 | A * | 6/1995 | Hirao et al. | 528/198 |

* cited by examiner

*Primary Examiner*—Kelechi C Egwim

(57) ABSTRACT

Methods for making a branched polycarbonate are disclosed. An interfacial mixture comprising water, a substantially water-immiscible organic solvent, a dihydroxy compound, a polyhydric branching agent, an endcapping agent, a catalyst, and a base is formed. The base and the branching agent are dissolved in the mixture before the dihydroxy compound is added, and the interfacial mixture has a basic pH. The mixture is reacted by adding a carbonate precursor to the mixture while maintaining the pH between about 8 and about 10 to form the branched polycarbonate. The resulting branched polycarbonates may contain more than 1.5 mole % of the THPE; have residual chloride content of 20 ppm or less; and a weight average molecular weight of about 55,000 or less. They may also be highly transparent.

16 Claims, No Drawings

BRANCHED POLYCARBONATES AND PROCESSES FOR PRODUCING THE SAME

CROSS-REFERENCE TO RELATED APPLICATIONS

This application is related to U.S. patent application Ser. No. 12/164,975, entitled "Branched Polycarbonate-Polysiloxane Copolymers And Processes For Producing The Same," filed Jun. 30, 2008. The entirety of that disclosure is hereby fully incorporated by reference.

BACKGROUND

The present disclosure relates to processes and intermediates for preparing branched polycarbonates compositions. In this regard, the disclosure relates to the interfacial synthesis of branched polycarbonates and to compositions produced by such processes. Also included are articles, such as molded, extruded, thermoformed, etc. articles, formed from these compositions.

Polycarbonates (PC) are synthetic thermoplastic resins derived from bisphenols and phosgene, or their derivatives. They are linear polyesters of carbonic acid and can be formed interfacially from reaction of dihydroxy compounds with phosgene or via ester interchange by reaction of dihydroxy compounds with a carbonate diester.

The desired properties of polycarbonates include clarity or transparency (i.e. 90% light transmission or more), high impact strength and toughness, heat resistance, weather and ozone resistance, good ductility, being combustible but self-extinguishing, good electrical resistance, noncorrosive, nontoxic, etc. They are useful for forming a wide array of products, such as by molding, extrusion, and thermoforming processes. Branched polycarbonates, in some instances, can produce enhanced, or more desirable, characteristics over conventional linear polycarbonates.

In producing a polycarbonate, a homopolycarbonate is generally formed from the polymerization of a dihydroxy compound such as bisphenol-A. To form a branched polycarbonate, a branching agent which has at least three functional groups is added to the mixture. Exemplary branching agents include trimellitic trichloride and 1,1,1-tris(hydroxyphenyl)ethane (THPE). Typically, the branching agent is added during the reaction of the dihydroxy compound with phosgene. Because each functional group can react with a dihydroxy compound, branching occurs. However, one problem that arises from the use of a branching agent is high residual content of ionic groups, such as chlorides. High chloride content can adversely impact melt stability, hydrolytic stability, and possibly the color and/or transparency of articles molded from the polycarbonate.

It is desirable to generate new processes that allow the formation of branched polycarbonates without high residual ionic content. Included therein are processes for producing relatively transparent, flame-retardant polycarbonates capable of providing good flame retardance characteristics in thin wall constructions.

BRIEF DESCRIPTION

Disclosed, in various embodiments, are methods for producing branched polycarbonates without high residual ionic content, as well as methods for producing branched polycarbonates with higher levels of branching. Also disclosed are the resulting branched polycarbonates produced by these methods and articles formed therefrom.

Disclosed in embodiments is a method for making a branched polycarbonate, comprising:

forming an interfacial mixture comprising water, a substantially water-immiscible organic solvent, a dihydroxy compound, a polyhydric branching agent, an endcapping agent, a catalyst, and a base, wherein the base and the branching agent are dissolved in the mixture before the dihydroxy compound is added to the mixture and wherein the interfacial mixture has a basic pH; and reacting the mixture by adding a carbonate precursor to the mixture while maintaining the pH between about 8 and about 10 to form the branched polycarbonate, wherein the branched polycarbonate contains 20 ppm or less of residual chloride and contains at least 1.5 mole % of the polyhydric branching agent.

The organic solvent is desirably methylene chloride or a chlorine-containing aromatic solvent. The endcapping agent is desirably 4-cyanophenol, p-cumyl phenol, phenol, or 4-t-butylphenol. The catalyst is desirably triethylamine and the carbonate precursor may be phosgene.

The carbonate precursor may be added to the mixture at more than one and less than five addition rates.

The polyhydric branching agent may be selected from the group consisting of 1,1,1-tris(4-hydroxyphenyl)ethane, 1,3,5-tris(4-hydroxyphenyl)benzene, tris(4-hydroxyphenyl)methane, 1,1,2-tris(4-hydroxyphenyl)propane, 1,3,5-trihydroxybenzene, m-terphenyltriol, trisphenol PA, trisphenol TC, and trisphenol OC—HAP.

In some more specific embodiments, the branched polycarbonate can contain at least 3.0 mole % of the polyhydric branching agent. The branched polycarbonate may have a weight average molecular weight of 55,000 or less; a weight average molecular weight of 20,000 or more; and/or a haze level of 10 percent or less when measured according to ASTM D1003.

In some embodiments, the branched polycarbonate has a weight average molecular weight of 33,000 or less and a haze level of 5 percent or less when measured according to ASTM D1003.

The method may further comprise separating the branched polycarbonate from the interfacial mixture.

In other embodiments, a method for making a branched polycarbonate may comprise:

forming an aqueous caustic solution comprising water, a base and a polyhydric branching agent;

forming an interfacial mixture comprising water, a substantially water-immiscible organic solvent, a dihydroxy compound, the aqueous caustic solution, an endcapping agent, a catalyst, and a base, wherein the dihydroxy compound is added after the aqueous caustic solution is added, and wherein the interfacial mixture has a basic pH; and reacting the interfacial mixture by adding a carbonate precursor to the mixture while maintaining the pH between about 8 and about 10 to form the branched polycarbonate, wherein the branched polycarbonate contains 20 ppm or less of residual chloride and contains at least 1.5 mole % of the polyhydric branching agent.

The branched polycarbonates formed using such processes, as well as articles formed from such branched polycarbonates, are also disclosed. These and other non-limiting characteristics are more particularly described below.

DETAILED DESCRIPTION

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement techniques of the type described in the present application to determine the value.

The singular forms "a," "an," and "the" include plural referents unless the context clearly dictates otherwise. All ranges disclosed herein are inclusive of the recited endpoint and independently combinable (for example, the range of "from 2 grams to 10 grams" is inclusive of the endpoints, 2 grams and 10 grams, and all the intermediate values).

The modifier "about" used in connection with a quantity is inclusive of the stated value and has the meaning dictated by the context (for example, it includes at least the degree of error associated with the measurement of the particular quantity).

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups comprise at least one carbon atom and may include heteroatoms such as nitrogen, sulfur, silicon, selenium and oxygen. Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. Alkyl groups may be saturated or unsaturated; in other words, they may be alkanes, alkenes, or alkynes. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The terms "cycloalkyl" and "cycloaliphatic" refer to an array of atoms which is cyclic but which is not aromatic. The cyclic portion of the cycloaliphatic group may include heteroatoms such as nitrogen, sulfur, selenium, silicon and oxygen, while the cyclic portion of the cycloalkyl group is composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "hydrocarbon" refers to an array of atoms composed exclusively of carbon and hydrogen. A hydrocarbon group may also be an alkyl group, an aromatic group, or a cycloalkyl group, and may include combinations of these groups.

When used in reference to pH, the term "greater" with reference to a pH value means that the pH range is more basic. The term "less" means that the pH range is more acidic. For example, "a pH of 6 or greater" includes pHs of 7, 8, 9, etc., while "a pH of 6 or less" includes pHs of 5, 4, 3, etc.

The branched polycarbonates of the present disclosure are prepared from an initial interfacial mixture comprising water, a substantially water-immiscible organic solvent, a dihydroxy compound, a polyhydric branching agent, an endcapping agent, a catalyst, and a base, wherein the initial interfacial mixture has a basic pH. In particular embodiments, the initial interfacial mixture has a pH of 9 or greater. As described further herein, the base and polyhydric branching agent are dissolved in the mixture (the water and organic solvent) before the dihydroxy compound is added to the mixture.

The water and substantially water-immiscible organic solvent allow interfacial polymerization to occur at their interfaces. The term "substantially water-immiscible" means that the organic solvent will not mix with water in any proportion to form a homogeneous solution. Suitable organic solvents are known in the art. Exemplary organic solvents include methylene chloride, chloroform, chlorobenzene, and other chlorine-containing aromatic solvents. In specific embodiments, the organic solvent used is methylene chloride.

Dihydroxy compounds generally have the formula HO—R$^1$—OH, which includes dihydroxy compounds of formula (1)

(1)

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of Y$^1$ include —O—, —S—, methylene, cyclohexyl-methylene, 2-[2.2.1]-bicycloheptylidene, isopropylidene, and adamantylidene. In particular, the bridging radical Y$^1$ may be a hydrocarbon group or a saturated hydrocarbon group such as methylene, cyclohexylidene, or isopropylidene. Also included are bisphenol compounds of general formula (2):

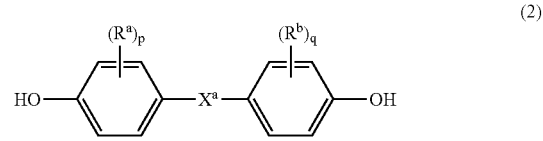
(2)

wherein R$^a$ and R$^b$ each represent a halogen atom or a monovalent hydrocarbon group and may be the same or dif ferent; p and q are each independently integers of 0 to 4; and $X^a$ represents one of the groups of formula (3):

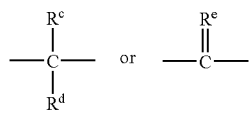
(3)

wherein $R^c$ and $R^d$ each independently represent a hydrogen atom or a monovalent linear or cyclic hydrocarbon group and $R^e$ is a divalent hydrocarbon group.

Other bisphenols containing substituted or unsubstituted cyclohexane units can be used, for example bisphenols of formula (4):

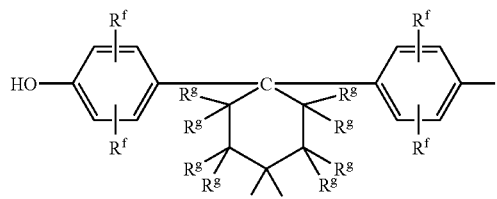
(4)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures.

In some embodiments, the branched polycarbonate may contain structural units of formula (5):

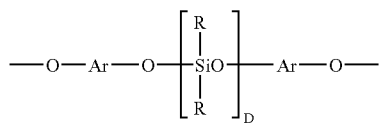
(5)

wherein D has an average value of 2 to 1,000; each R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group; and each Ar may independently be the same or different, and is a substituted or unsubstituted $C_6$-$C_{30}$ arylene radical, wherein the bonds are directly connected to an aromatic moiety. Useful Ar groups in formula (5) may be any monocyclic divalent aryl radical.

Units of formula (5) may be derived from the corresponding dihydroxy compound of formula (6):

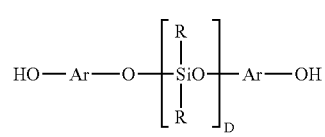
(6)

wherein R, Ar, and D are as described above. Compounds of formula (6) may be obtained by the reaction of a dihydroxyarylene compound with, for example, an alpha, omega-bisacetoxypolydiorganosiloxane under phase transfer conditions.

In other embodiments, the siloxane unit may be derived from structural units of formula (7):

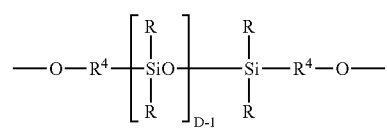
(7)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound.

In other embodiments, the siloxane unit may be derived from structural units of formula (8):

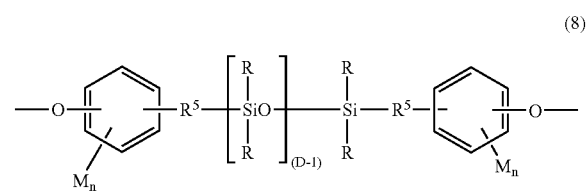
(8)

wherein R and D are as defined above. Each $R^5$ in formula (8) is independently a divalent $C_2$-$C_8$ aliphatic group. Each M in formula (8) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (8) may be derived from the corresponding dihydroxy polydiorganosiloxane (9):

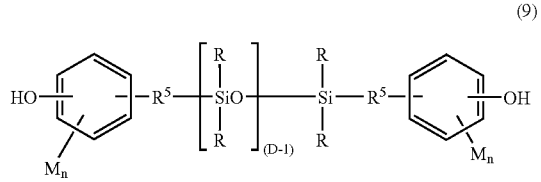

wherein R, D, M, $R^5$, and n are as described above. Such dihydroxy polysiloxanes can be made by effecting a platinum catalyzed addition between a siloxane hydride of formula (10):

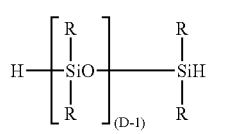

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In specific embodiments, the dihydroxy compound may have the structure of Formula (I):

Formula (I)

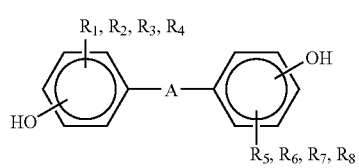

wherein $R_1$ through $R_8$ are each independently selected from hydrogen, halogen, nitro, cyano, $C_1$-$C_{20}$ alkyl, $C_1$-$C_{20}$ aliphatic, $C_4$-$C_{20}$ cycloalkyl, and $C_6$-$C_{20}$ aryl; and A is selected from a bond, —O—, —S—, —$SO_2$—, $C_1$-$C_{12}$ alkyl, $C_6$-$C_{20}$ aromatic, $C_1$-$C_{20}$ aliphatic, and $C_6$-$C_{20}$ cycloaliphatic.

In specific embodiments, the dihydroxy compound of Formula (I) is 2,2-bis(4-hydroxyphenyl)propane (i.e. bisphenol-A or BPA). Other illustrative compounds of Formula (I) include:
2,2-bis(3-bromo-4-hydroxyphenyl)propane;
2,2-bis(4-hydroxy-3-methylphenyl)propane;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane;
4,4'-dihydroxy-1,1-biphenyl;
4,4'-dihydroxy-3,3'-dimethyl-1,1-biphenyl;
4,4'-dihydroxy-3,3'-dioctyl-1,1-biphenyl;
4,4'-dihydroxydiphenylether;
4,4'-dihydroxydiphenylthioether; and
1,3-bis(2-(4-hydroxyphenyl)-2-propyl)benzene.

The polyhydric branching agent of the present disclosure may be any branching agent having at least three hydroxyl groups for branching. For example, the branching agent may be a polyphenolic compound of the following formula (11):

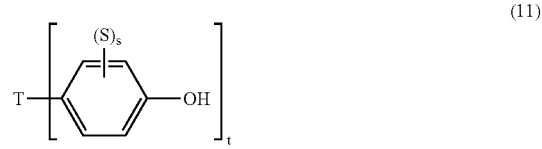

wherein T is a $C_{1-20}$ hydrocarbon group; each S is independently a halogen, $C_{1-3}$ alkyl group, $C_{1-3}$ alkoxy group, $C_{7-12}$ arylalkyl, alkylarlyl, or nitro group; each s is independently 0 to 4; and t is an integer of 3 or more. Typically, t will be 3 or 4. In particular embodiments, T is ethyl, t is 3, and each s is zero; this compound is 1,1,1-tris(4-hydroxyphenyl)ethane, or THPE. Other branching agents described by formula (11) include 1,3,5-tris(4-hydroxyphenyl)benzene, tris(4-hydroxyphenyl)methane, 1,1,2-tris(4-hydroxyphenyl)propane, trisphenol PA, 1,3,5-tris((4-hydroxyphenyl)isopropyl)benzene (trisphenol TC), and 1,1,1-tris(3-methyl-4-hydroxyphenyl)ethane (trisphenol OC—HAP). In particular, some trisphenols that are poorly soluble in methylene chloride and poorly soluble in water can be solubilized by the addition of a base, such as NaOH. Other exemplary polyhydric branching agents include 1,3,5-trihydroxybenzene and m-terphenyl-triol. Other polyphenolic compounds that are poorly soluble in water and methylene chloride may also be used, such as those that may be disclosed in U.S. Reissue Pat. No. RE27,682.

The molar ratio of the dihydroxy compound to the polyhydric branching agent generally determines the amount of branching present in the resulting branched polycarbonate. The relative amount of branching agent will depend on a number of considerations, such as the amount of endcapping agent and the desired molecular weight of the branched polycarbonate. In embodiments, the molar ratio of dihydroxy compound to the polyhydric branching agent may be from about 10 to about 70. In more specific embodiments, the molar ratio of dihydroxy compound to the polyhydric branching agent 98.5:1.5 or greater, desirably about 97:3.

Any endcapping agent may generally be used. For example, p-cumyl phenol, phenol, and 4-t-butylphenol may be used as the endcapping agent. However, in specific embodiments, the endcapping agent is a cyanophenol of the formula (12):

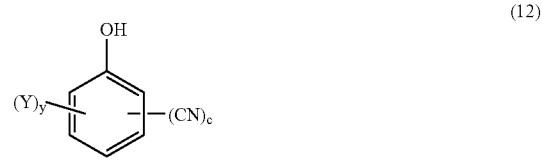

wherein Y is a halogen, $C_{1-3}$ alkyl group, $C_{1-3}$ alkoxy group, $C_{7-12}$ arylalkyl, alkylaryl, or nitro group; y is 0 to 4; c is 1 to 5; and $1 \leqq y+c \leqq 5$. Specific cyanophenols include 4-cyanophenol and 3,5-dicyanophenol. The endcapping agent is used to control the molecular weight of the resulting branched polycarbonate. The molar ratio of dihydroxy compound to endcapping agent may be from about 3 to about 20, including about 10. In more specific embodiments, the molar ratio of dihydroxy compound to endcapping agent may be from about 94:6 to about 80:20.

Suitable catalysts for the interfacial polymerization reaction are generally known to those in the art. They include aliphatic amines such as triethylamine. Generally, trialkylamines are especially preferred, wherein the alkyl groups contain up to about 4 carbon atoms. Another suitable catalyst is a phase transfer catalyst. Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, a $C_{1-8}$ alkoxy group or a $C_{6-18}$ aryloxy group. Combinations of such catalysts are also effective. An effective amount of catalyst may be about 0.1% by weight to about 10% by weight based on the weight of dihydroxy compound in the initial interfacial mixture. In more specific embodiments, an effective amount of catalyst may be about 0.5% by weight to about 2% by weight based on the weight of dihydroxy compound in the initial interfacial mixture. In some embodiments, the catalyst may comprise a mixture of methyl tributylammonium chloride and sodium gluconate.

To provide a basic pH to the interfacial mixture, any strong base may be used. A base is any substance that can accept protons and generally, when dissolved in water, gives a solution with a pH greater than 7. Exemplary bases include sodium hydroxide and potassium hydroxide. In particular, the polyhydric branching agent is exposed to a basic pH prior to being exposed to the dihydroxy compound. Put another way, the polyhydric branching agent and the base are added to the initial interfacial mixture and dissolved before adding the dihydroxy compound to the initial interfacial mixture. It has been discovered that adding the ingredients in this order significantly reduces the ionic content of the resulting branched polycarbonate. In particular, the branched polycarbonate may contain 20 ppm or less of residual chloride. The polyhydric branching agent and base can be added first to the water and organic solvent in the interfacial mixture and dissolved. Alternatively, the polyhydric branching agent and base can be dissolved in an aqueous solution, then added to the interfacial mixture before the dihydroxy compound is added.

The initial interfacial mixture is then reacted by adding a carbonate precursor to the mixture, causing the formation of carbonate linkages. Carbonate precursors include, for example, a carbonyl halide such as carbonyl bromide or carbonyl chloride, or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In exemplary embodiments, an interfacial polymerization reaction to form carbonate linkages uses phosgene as a carbonate precursor, and is referred to as a phosgenation reaction.

The carbonate precursor may be added to the mixture at different addition rates or at more than one addition rate during polymerization. In embodiments, the carbonate precursor is added in multiple additions to the mixture at more than one and less than five addition rates. Exemplary addition rates may be from about 0.01 to about 0.05 moles carbonate precursor/moles dihydroxy compound/minute. Generally, the interfacial mixture is reacted for a period of time ranging from about 5 minutes to about 60 minutes.

While the interfacial mixture is reacted, the pH is maintained between about 8 and about 10 until the reaction is substantially complete or complete. The branched polycarbonate can then be separated from the mixture using methods known in the art.

The resulting branched polycarbonate will contain 20 ppm or less of residual chloride and at least 1.5 mole % of the polyhydric branching agent. In further embodiments, the branched polycarbonate contains 3 mole % or more of the polyhydric branching agent. In other embodiments, the branched polycarbonate contains from at least 1.5 to about 5 mole % of the polyhydric branching agent. The mole percent of the polyhydric branching agent is calculated based on the moles of the branching agent and the dihydroxy compound only; the endcapping agent and siloxane oligomer are excluded from this calculation. The branched polycarbonate may also have a weight average molecular weight of about 55,000 or less, or a weight average molecular weight of about 20,000 or more. In particular embodiments, the weight average molecular weight of the branched polycarbonate is from about 20,000 to about 55,000. The molecular weight can be measured by gas permeation chromatography (GPC) using polycarbonate standards.

In addition, the branched polycarbonate may be transparent, particularly where the molecular weight is 33,000 or less. In embodiments, the haze level of the branched polycarbonate is 10 percent or less when measured according to ASTM D1003, including 5 percent or less.

Various additives ordinarily incorporated in resin compositions of this type may also be added to the polyestercarbonate as desired. Such additives include, for example, heat stabilizers; antioxidants; light stabilizers; plasticizers; antistatic agents; mold release agents; and blowing agents. Examples of heat stabilizers include triphenyl phosphite, tris-(2,6-dimethylphenyl)phosphite, tris-(2,4-di-t-butyl-phenyl) phosphite, tris-(mixed mono- and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of antistatic agents include glycerol monostearate, sodium stearyl sulfonate, and sodium dodecylbenzenesulfonate. Examples of mold releasing agents include pentaerythritol tetrastearate, stearyl stearate, beeswax, montan wax and paraffin wax.

Colorants may be added if desired. These include pigments, dyes, and quantum dots. The amount may vary as needed to achieve the desired color.

UV absorbers may be used. Exemplary UV absorbers include hydroxybenzophenones; hydroxybenzotriazoles; hydroxybenzotriazines; cyanoacrylates; oxanilides; benzoxazinones; or the like, or combinations comprising at least one of the foregoing UV absorbers.

Anti-drip agents may be included. Anti-drip agents may be, for example, a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A useful TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

A flame retardant may be added. The flame retardant may be a K, Na, or Li salt. Useful salt-based flame retardants include alkali metal or alkaline earth metal salts of inorganic protonic acids and organic Bronstëd acids comprising at least one carbon atom. These salts should not contain chlorine and/or bromine. Preferably, the salt-based flame retardants are sulfonates. In specific embodiments, the salt-based flame retardant is selected from the group consisting of potassium diphenylsulfon-3-sulfonate (KSS), potassium perfluorobutane sulfonate (Rimar salt), and combinations comprising at least one of the foregoing. Other flame retardants include organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds. Inorganic flame retardants may also be used.

Combinations of any of the foregoing additives may be used. Such additives may be mixed in at a suitable time during the mixing of the components for forming the polyestercarbonate.

The branched polycarbonates of the present disclosure may be formed into articles by conventional plastic processing techniques. Molded articles may be made by compression molding, injection molding or such molding techniques known to those skilled in the art. Such articles may include, but are not limited to, film, sheet, pipes, tubes, profiles, molded articles, preforms, stretch molded films and containers, injection molded containers, extrusion molded films and containers, thermoformed articles and the like. Articles prepared from the compositions of the present disclosure may be used in a wide variety of applications.

The following examples are provided to illustrate the branched polycarbonates and methods of the present disclosure. The examples are merely illustrative and are not intended to limit the disclosure to the materials, conditions, or process parameters set forth therein.

EXAMPLES

Example 1

A 75 L glass reactor was equipped with a condenser, agitator, pH probe, caustic and phosgene inlets, and recirculation loop. Methylene chloride (16 L), water (14 L), bisphenol-A (4540 grams, 19.9 moles), triethylamine (30 mL, 0.215 moles), 4-cyanophenol (225 grams, 1.89 moles) and sodium gluconate (10 grams) were added to the reactor as the initial mixture.

Next, an aqueous THPE/NaOH solution of THPE (182.8 grams, 0.597 moles) and NaOH (50% w/w, 206 grams, 2.575 moles) in water (1 L) was added to the reactor.

Then, phosgene (1574 g, 26.0 moles) and an aqueous solution of NaOH (50% w/w) were co-fed to the reactor; the NaOH was provided to maintain the reactor pH between 8.5 and 10. A total of 2574 grams phosgene (26.0 moles) was added during phosgenation. The phosgene was added in three steps, as shown in the following Table 1.

TABLE 1

| Phosgenation Step | % of total Phosgene (%) | Mass of Phosgene Added During Step (g) | Addition Rate (g/min) | pH Target | phosgene/ NaOH molar ratio |
| --- | --- | --- | --- | --- | --- |
| 1 | 0 to 34 | 875 | 80 | 9.2 | 2.5 |
| 2 | 34 to 50 | 412 | 50 | 9.3 | 2.5 |
| 3 | 50 to 100 | 1287 | 80 | 9.3 | 2.50 to 3.00 ramp |

After phosgenation was completed, the batch was sampled for molecular weight analysis (the "reaction" sample). The batch was then re-phosgenated and transferred to a centrifuge feed tank. The resultant solution of polymer in methylene chloride was purified by acid wash and further purified with subsequent water washes via centrifugation (the "centrifuge" sample). The final polymer was isolated by steam precipitation and dried under a stream of hot nitrogen (the "isolated product" sample). The resulting branched polycarbonate had a Mw of 37,396 and polydispersity of 4.93.

Example 2

An aqueous THPE/NaOH solution of branching agent was prepared by mixing THPE (6.05 lbs, 8.96 moles) with water (4 L) and an aqueous NaOH solution (50% w/w, 2 L, 3058 grams, 38.2 moles NaOH).

A 300 gallon glass reactor was equipped with a condenser, agitator, pH probe, phosgene inlet, caustic inlet, and recirculation loops. The reactor was charged with water (56 gallons), methylene chloride (160 gallons), bisphenol-A (150 lbs, 298 moles), the aqueous THPE/NaOH solution (total 6 L), sodium gluconate (0.36 lbs), 4-cyanophenol (3.375 kg, 28.3 moles), and triethylamine (0.66 kg, 6.53 moles).

The polymer was then obtained by phosgenating, purifying, and isolating as described in Example 1, except the pH target for all phosgenation steps was 8.5.

Example 3

A 300 gallon glass reactor was equipped with a condenser, agitator, pH probe, phosgene inlet, caustic inlet, and recirculation loops. The reactor was charged with water (56 gallons), an aqueous NaOH solution (50% w/w, 11.5 lbs total, 65.2 moles NaOH), and solid THPE (6.05 lbs, 8.96 moles). The solution was stirred for 5 minutes.

Next, bisphenol-A (150 lbs, 298 moles), 4-cyanophenol (3.375 kg, 28.3 moles), methylene chloride (145 gallons), sodium gluconate (0.36 lbs), and triethylamine (0.66 kg, 6.53 moles) were added.

The polymer was then obtained by phosgenating, purifying, and isolating as described in Example 2.

Example 4

An aqueous THPE/NaOH solution was prepared by mixing THPE (68 lbs, 100.7 moles) with water (217 lbs) and an aqueous NaOH solution (50% w/w, 55 lbs, 311.8 moles NaOH).

A 300 gallon glass reactor was equipped with a condenser, agitator, pH probe, phosgene inlet, caustic inlet, and recirculation loops. The reactor was charged with water (56 gallons), aqueous THPE/NaOH solution (19.4% w/w, 30.9 lbs, 8.96 moles THPE), bisphenol-A (150 lbs, 298 moles), 4-cyanophenol (3.375 kg, 28.3 moles), methylene chloride (145 gallons), sodium gluconate (0.36 lbs), and triethylamine (0.66 kg, 6.53 moles).

The polymer was then obtained by phosgenating, purifying, and isolating as described in Example 2.

Example 5

An aqueous THPE/NaOH solution was prepared by mixing THPE (68 lbs, 100.7 moles) with water (217 lbs) and an aqueous NaOH solution (50% w/w, 55 lbs, 311.8 moles NaOH).

A 300 gallon glass reactor was equipped with a condenser, agitator, pH probe, phosgene inlet, caustic inlet, and recirculation loops. The reactor was charged with water (56 gallons), aqueous THPE/NaOH solution (19.4% w/w, 30.9 lbs, 8.96 moles THPE), bisphenol-A (150 lbs, 298 moles), 4-cyanophenol (3.375 kg, 28.3 moles), methylene chloride (145 gallons), sodium gluconate (0.36 lbs), and triethylamine (0.66 kg, 6.53 moles).

The polymer was then obtained by phosgenating, purifying, and isolating as described in Example 3.

Examples 6-10

Examples 6-10 were prepared according to Example 5, varying only the loadings for the endcapping agent 4-cyanophenol and the branching agent THPE.

Comparative Example 1

A 75 L glass reactor was equipped with a condenser, agitator, pH probe, caustic and phosgene inlets, and recirculation loop. Methylene chloride (16 L), water (14 L), bisphenol-A (4540 grams, 19.9 moles), triethylamine (20 mL, 0.144 moles), and sodium gluconate (10 grams) were added to the reactor as the initial mixture. Phosgene and NaOH were co-fed to the reactor; the NaOH was provided to maintain the reactor pH between 8.5 and 10.

A total of 2574 grams phosgene (26.0 moles) was added during phosgenation. The phosgene was added in four steps, as shown in the following Table 2.

TABLE 2

| Phosgenation Step | % of total Phosgene (%) | Mass of Phosgene Added During Step (g) | Addition Rate (g/min) | pH Target | phosgene/NaOH molar ratio |
|---|---|---|---|---|---|
| 1 | 0 to 7.6 | 196 | 80 | 9.2 | 2.5 |
| 2 | 7.6 to 34 | 679 | 80 | 9.3 | 2.5 |
| 3 | 34 to 50 | 412 | 50 | 9.3 | 2.5 |
| 4 | 50 to 100 | 1287 | 80 | 9.3 | 2.50 to 3.00 ramp |

A one liter solution of 4-cyanophenol (225 grams, 1.89 moles) and triethylamine (38 mL, 27.59 grams, 0.273 moles) dissolved in methylene chloride was added to the reactor during phosgenation at the start of step 2 with a flow rate of 350 g/min. Using total phosgene added as a measure of the reaction progress, the cyanophenol solution was added from 7.5% of total phosgene to 19% of total phosgene over a 3.5 minute period.

Next, a solution of THPE (182.8 grams, 0.597 moles) and NaOH (50% w/w, 206 grams, 2.575 moles) in water (1 L) was added to the reactor during phosgenation at the start of step 3 with a flow rate of 110 g/min.

After phosgenation was completed, the batch was sampled for molecular weight analysis, re-phosgenated and transferred to a centrifuge feed tank. The resultant solution of polymer in methylene chloride was purified by acid wash and further purified with subsequent water washes via centrifugation. The final polymer was not isolated due to the high chloride content observed on analysis of the centrifuge sample.

Comparative Example 2

A 75 L glass reactor was equipped with a condenser, agitator, pH probe, caustic and phosgene inlets, and recirculation loop. Methylene chloride (16 L), water (14 L), bisphenol-A (4540 grams, 19.9 moles), triethylamine (20 mL, 0.144 moles), and sodium gluconate (10 grams) were added to the reactor as the initial mixture. Phosgene and NaOH were co-fed to the reactor; the NaOH was provided to maintain the reactor pH between 8.5 and 10.

A total of 2574 grams phosgene (26.0 moles) was added during phosgenation. The phosgene was added in four steps, as shown in the following Table 3.

TABLE 3

| Phosgenation Step | % of total Phosgene (%) | Mass of Phosgene Added During Step (g) | Addition Rate (g/min) | pH Target | phosgene/NaOH molar ratio |
|---|---|---|---|---|---|
| 1 | 0 to 3 | 75 | 80 | 9.2 | 2.5 |
| 2 | 3 to 10 | 182 | 50 | 9.3 | 2.5 |
| 3 | 10 to 26 | 412 | 50 | 9.3 | 2.5 |
| 4 | 26 to 100 | 1905 | 80 | 9.3 | 2.50 to 3.00 ramp |

A one liter solution of 4-cyanophenol (225 grams, 1.89 moles) and triethylamine (38 mL, 27.59 grams, 0.273 moles) dissolved in methylene chloride was added to the reactor during phosgenation at the start of step 2 with a flow rate of 350 g/min. Using total phosgene added as a measure of the reaction progress, the cyanophenol solution was added from 3% of total phosgene to 10% of total phosgene over a 3.5 minute period.

Next, a solution of THPE (182.8 grams, 0.597 moles) and NaOH (50% w/w, 206 grams, 2.575 moles) in water (1 L) was added to the reactor during phosgenation at the start of step 3 with a flow rate of 410 g/min. This THPE solution was thus added from 11% of total phosgene to 16% of total phosgene over a 4 minute period.

After phosgenation was completed, the batch was sampled for molecular weight analysis, re-phosgenated and transferred to a centrifuge feed tank. The resultant solution of polymer in methylene chloride was purified by acid wash and further purified with subsequent water washes via centrifugation. The final polymer was not isolated due to the high chloride content observed on analysis of the centrifuge sample.

Comparative Example 3

A 300 gallon glass reactor was equipped with a condenser, agitator, pH probe, phosgene inlet, caustic inlet, and recirculation loops. The reactor was charged with water (56 gallons), methylene chloride (145 gallons), solid THPE (6.05 lbs, 8.96 moles), bisphenol-A (150 lbs, 298 moles), sodium gluconate (0.36 lbs), 4-cyanophenol (3.375 kg, 28.3 moles), and triethylamine (0.66 kg, 6.53 moles).

Phosgene and an aqueous solution of NaOH (50% w/w) were co-fed to the reactor; the NaOH was provided to maintain the reactor pH. A total of 85 pounds phosgene (389.8 moles) was added during phosgenation. The phosgene was added in four steps, as shown in the following Table 4.

TABLE 4

| Phosgenation Step | % of total Phosgene (%) | Mass of Phosgene Added During Step (lbs) | Addition Rate (lbs/hr) | pH Target |
|---|---|---|---|---|
| 1 | 0 to 30 | 25.5 | 250 | 8.5-9.0 |
| 2 | 30 to 80 | 42.5 | 250 | 8.5-9.0 |
| 3 | 80 to 90 | 8.5 | 200 | 8.5-9.0 |
| 4 | 90 to 100 | 8.5 | 150 | 8.5-9.0 |

The NaOH/phosgene weight ratio began at 2.30 and was changed to 1.70 after 10% of total phosgene had been added, 2.50 after 20% addition of phosgene, and 2.60 after 70% addition of phosgene.

After phosgenation, the batch was sampled for molecular weight analyses and then re-phosgenated (10 lbs phosgene, 45.9 moles, pH target 9.1). The batch was transferred to a centrifuge feed tank, where hydrochloric acid was added to lower the pH of the batch to less than 9. The resultant solution of polymer in methylene chloride was purified by acid wash to remove amine catalysts and subsequent water washes to remove brine and acid via centrifugation. The final polymer was isolated by steam precipitation and dried under a stream of hot nitrogen.

Comparative Example 4

A 300 gallon glass reactor was equipped with a condenser, agitator, pH probe, phosgene inlet, caustic inlet, and recirculation loops. The reactor was charged with water (56 gallons), an aqueous NaOH solution (50% w/w, 11.5 lbs, 65.2 moles NaOH), bisphenol-A (150 lbs, 298 moles), 4-cyanophenol (3.375 kg, 28.3 moles), solid THPE (6.05 lbs, 8.96 moles), methylene chloride (145 gallons), sodium gluconate (0.36 lbs), and triethylamine (0.66 kg, 6.53 moles) in that order.

The polymer was then obtained by phosgenating, purifying, and isolated as described in Comparative Example 3.

Results

Some of the Examples were performed multiple times. A letter following the Example was used to designate the results of each trial.

Comparative Example 1, Comparative Example 2, and Example 1 added THPE to the interfacial mixture at different points of phosgenation. Table 5 summarizes the results of the branched polycarbonates formed. The weight average molecular weight (Mw) and polydispersity index (PDI) were measured by GPC using polycarbonate standards, and used the "centrifuge" sample for Example 1.

TABLE 5

| Example | When THPE added | % solids | chloride (ppm) | Mw | PDI |
|---|---|---|---|---|---|
| Comp Ex. 1 | 7.5% to 19% phosgene | 8.2 | 2406.8 | 28897 | 3.87 |
| Comp. Ex 2 | 11% to 16% phosgene | 7 | 765.0 | 31192 | 3.9 |
| Ex. 1A | prior to phosgene | 8 | 7.7 | 32716 | 4.15 |
| Ex. 1B | prior to phosgene | 8.4 | 6.3 | 41515 | 4.82 |
| Ex. 1C | prior to phosgene | 8.4 | 3.9 | 38848 | 5.25 |

When the THPE was added after the start of phosgenation, polycarbonates with high residual chloride content resulted. Adding the THPE prior to the start of phosgenation resulted in polycarbonates with low residual chloride content. Without being limited by theory, there may be two possible explanations. First, adding the THPE during phosgenation could result in incomplete THPE incorporation, which causes the presence of unreacted phenolic end groups capable of brine sequestration. Alternatively, adding the THPE during phosgenation could result in higher local concentrations of branching agent, forming a gel within the polymer chain that traps brine water.

In the tables below, examples 2-6 showed the effect of the method of adding the THPE to the interfacial mixture in correlated samples. Table 6 summarizes the results for some branched polycarbonates using the "centrifuge" samples. Table 7 summarizes the results for some branched polycarbonates using the "isolated product" samples. Table 8 summarizes the results for some branched polycarbonates using the "reaction" samples.

TABLE 6

| Example | Mode of THPE addition | % solids | chloride (ppm) | Mw | mole % THPE | mole % 4-cyanophenol |
|---|---|---|---|---|---|---|
| Comp. Ex. 3A | solid, no NaOH | 6.2 | >100 | 22442 | 3.03 | 9.55 |
| 2A | aqueous THPE/NaOH solution | 8.5 | 1.2 | 28039 | 3.01 | 9.51 |
| 3A | solid, then aqueous NaOH | 11.5 | 0.88 | 28546 | 3.06 | 9.67 |
| 3B | solid, then aqueous NaOH | 9.2 | 0.2 | 30746 | 2.98 | 8.98 |
| 4A | metered solution | 8.8 | 2.12 | 37896 | 2.99 | 8.10 |
| 4B | metered solution | 8.9 | 1.77 | 40821 | 3.02 | 8.28 |
| Comp. Ex. 4A | aqueous NaOH, BPA, then THPE | 8.6 | 51.89 | 36851 | 3.02 | 7.94 |

TABLE 7

| Example | Mode of THPE addition | chloride (ppm) | Mw | Mn | PDI | mole % THPE | mole % 4-cyanophenol |
|---|---|---|---|---|---|---|---|
| Comp. Ex. 3A | solid, no NaOH | | 24200 | 5625 | 4.30 | 3.03 | 9.55 |
| Comp. Ex. 3B | solid, no NaOH | 1222 | 24484 | 6912 | 3.54 | 3.03 | 9.55 |
| 4A | aqueous THPE/NaOH solution | 1.04 | 27225 | 7147 | 3.81 | 3.01 | 9.51 |
| 4B | aqueous THPE/NaOH solution | 0.79 | 28379 | 7199 | 3.94 | 3.01 | 9.51 |
| 5A | solid, then aqueous NaOH | 0.07 | 27470 | 7470 | 3.68 | 3.06 | 9.67 |
| 5B | solid, then aqueous NaOH | 0.32 | 27207 | 7391 | 3.68 | 3.06 | 9.67 |
| 5C | solid, then aqueous NaOH | 1.54 | 39761 | 7834 | 5.08 | 3.02 | 8.28 |
| 6A | metered solution | 0.08 | 30840 | 7443 | 4.14 | 2.98 | 8.98 |
| 6B | metered solution | 0.54 | 38005 | 8083 | 4.70 | 2.99 | 8.10 |
| Comp. Ex. 4A | aqueous NaOH, BPA, then THPE | 34.46 | 37181 | 8157 | 4.56 | 3.02 | 7.94 |

TABLE 8

| Example | Mode of THPE addition | Mw | Mn | PDI | mole % THPE | mole % 4-cyanophenol |
|---|---|---|---|---|---|---|
| Comp. Ex. 3A | solid, no NaOH | 23558 | 6039 | 3.9 | 3.05 | 9.63 |
| Comp. Ex. 3B | solid, no NaOH | 22072 | 5272 | 4.19 | 3.03 | 9.55 |
| Comp. Ex. 3C | solid, no NaOH | 20917 | 5580 | 3.75 | 3.04 | 9.59 |
| 2A | aqueous THPE/NaOH solution | 26049 | 6797 | 3.83 | 3.02 | 9.62 |
| 2B | aqueous THPE/NaOH solution | | | | 3.01 | 9.50 |
| 2C | aqueous THPE/NaOH solution | | | | 3.03 | 9.56 |
| 3A | solid, then aqueous NaOH | 26382 | 6958 | 3.79 | 3.05 | 9.57 |
| 3B | solid, then aqueous NaOH | 26608 | 7011 | 3.795 | 3.06 | 9.67 |
| 3C | solid, then aqueous NaOH | 28546 | 7256 | 3.93 | 3.04 | 9.33 |
| 3D | solid, then aqueous NaOH | | | | 3.02 | 8.28 |
| 4A | metered solution | 31533 | 7441 | 4.237 | 2.98 | 8.98 |
| 4B | metered solution | 31014 | 7244 | 4.28 | 3.00 | 9.25 |
| 4C | metered solution | 40657 | 7960 | 5.107 | 3.02 | 8.51 |
| 4D | metered solution | 39094 | 7461 | 5.24 | 2.99 | 8.10 |
| Comp. Ex. 4A | aqueous NaOH, BPA, then THPE | | | | 3.02 | 8.08 |
| Comp. Ex. 4B | aqueous NaOH, BPA, then THPE | | | | 3.02 | 7.94 |

The results indicated that a solution of THPE with a base, such as NaOH, resulted in branched polycarbonates having low residual chloride content, regardless of the molecular weight of the polycarbonate. Adding THPE without the base resulted in high residual chloride content and lower molecular weight (see Comp. Ex. 3). The basic THPE solution could also be made in situ, as seen in Example 3. However, the THPE had to be dissolved in the basic solution prior to addition of bisphenol-A, or high residual chloride content still resulted (Comp. Ex. 4). In other words, the order of addition of the ingredients was important.

The results of Example 5-10 are shown in Table 9 and summarize the relationship between the loading of THPE, loading of 4-cyanophenol, molecular weight, and haze. The "isolated product" samples were examined for haze.

TABLE 9

| Example | Average Haze | Std Dev Haze | Average Mw | Std Dev Mw | mole % THPE | mole % 4-cyanophenol |
|---|---|---|---|---|---|---|
| 5 | 1.48 | 1.15 | 30843 | 361 | 3.0 | 9.15 |
| 6 | 5.37 | 3.10 | 38898 | 1420 | 3.0 | 8.37 |
| 7 | 43.23 | 11.11 | 51085 | 1050 | 3.0 | 7.82 |
| 8 | 0.66 | 0.15 | 28882 | 3341 | 4.5 | 12.46 |
| 9 | 8.40 | 11.75 | 38413 | 3373 | 4.5 | 11.88 |
| 10 | 61.75 | 3.04 | 48037 | 665 | 4.5 | 10.83 |

Surprisingly, hazy product was produced at higher molecular weights. This was surprising because no haze effect occurred for linear resins having a similar molecular weight. The increase in haze also increased with the loading of THPE.

The branched polycarbonates and processes of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for making a branched polycarbonate, comprising:
   forming an interfacial mixture comprising water, a substantially water-immiscible organic solvent, a dihydroxy compound, a polyhydric branching agent, an endcapping agent, a catalyst, and a base, wherein the base and the branching agent are dissolved in the mixture before the dihydroxy compound is added to the mixture and wherein the interfacial mixture has a basic pH; and
   reacting the mixture by adding a carbonate precursor to the mixture while maintaining the pH between about 8 and about 11 to form the branched polycarbonate, wherein the branched polycarbonate contains 20 ppm or less of residual chloride and contains at least 1.5 mole % of the polyhydric branching agent.

2. The method of claim 1, wherein the organic solvent is methylene chloride or a chlorine-containing aromatic solvent.

3. The method of claim 1, wherein the endcapping agent is 4-cyanophenol, p-cumyl phenol, phenol, or 4-t-butylphenol.

4. The method of claim 1, wherein the catalyst is triethylamine.

5. The method of claim 1, wherein the carbonate precursor is phosgene.

6. The method of claim 1, wherein the carbonate precursor is added to the mixture at more than one and less than five addition rates.

7. The method of claim 1, wherein the polyhydric branching agent is selected from the group consisting of 1,1,1-tris(4-hydroxyphenyl)ethane, 1,3,5-tris(4-hydroxyphenyl)benzene, tris(4-hydroxyphenyl)methane, 1,1,2-tris(4-hydroxyphenyl)propane, 1,3,5-trihydroxybenzene, m-terphenyltriol, trisphenol PA, 1,3,5-tris((4-hydroxyphenyl)isopropyl)benzene, and 1,1,1-tris(3-methyl-4-hydroxyphenyl)ethane.

8. The method of claim 1, wherein the branched polycarbonate contains at least 3.0 mole % of the polyhydric branching agent.

9. The method of claim 1, wherein the branched polycarbonate has a weight average molecular weight of 55,000 or less.

10. The method of claim 1, wherein the branched polycarbonate has a weight average molecular weight of 20,000 or more.

11. The method of claim 1, wherein the branched polycarbonate has a haze level of 10 percent or less when measured according to ASTM D1003.

12. The method of claim 1, wherein the branched polycarbonate has a weight average molecular weight of 33,000 or less and a haze level of 5 percent or less when measured according to ASTM D1003.

13. The method of claim 1, further comprising separating the branched polycarbonate from the interfacial mixture.

14. The branched polycarbonate formed by the method of claim 1.

15. A method for making a branched polycarbonate, comprising:
   forming an aqueous caustic solution comprising water, a base and a polyhydric branching agent;
   forming an interfacial mixture comprising water, a substantially water-immiscible organic solvent, a dihydroxy compound, the aqueous caustic solution, an endcapping agent, a catalyst, and a base, wherein the dihydroxy compound is added after the aqueous caustic solution is added, and wherein the interfacial mixture has a basic pH; and
   reacting the interfacial mixture by adding a carbonate precursor to the mixture while maintaining the pH between about 8 and about 11 to form the branched polycarbonate, wherein the branched polycarbonate contains 20 ppm or less of residual chloride and contains at least 1.5 mole % of the polyhydric branching agent.

16. The branched polycarbonate formed by the method of claim 15.

* * * * *